United States Patent
Liang et al.

(10) Patent No.: US 9,123,030 B2
(45) Date of Patent: Sep. 1, 2015

(54) INDICATION OF OFF-SCREEN CALENDAR OBJECTS

(75) Inventors: Xuebo Liang, Brossard (CA); Rolan Abdukalykov, Montreal (CA); Alain Gauthier, Montreal (CA); Vincent Lavoie, Montreal (CA); Mohannad El-Jayousi, L'lle-Bizard (CA); Roy Ghorayeb, Montreal (CA)

(73) Assignee: SAP SE, Walldorf (DE)

( * ) Notice: Subject to any disclaimer, the term of this patent is extended or adjusted under 35 U.S.C. 154(b) by 130 days.

(21) Appl. No.: 13/562,080

(22) Filed: Jul. 30, 2012

(65) Prior Publication Data
US 2014/0028702 A1   Jan. 30, 2014

(51) Int. Cl.
*G09G 5/00* (2006.01)
*G06Q 10/10* (2012.01)

(52) U.S. Cl.
CPC ........ *G06Q 10/109* (2013.01); *G09G 2340/145* (2013.01)

(58) Field of Classification Search
None
See application file for complete search history.

(56) References Cited

U.S. PATENT DOCUMENTS

| | | |
|---|---|---|
| 5,745,110 A | 4/1998 | Ertemalp |
| 5,867,163 A | 2/1999 | Kurtenbach |
| 5,898,431 A | 4/1999 | Webster et al. |
| 6,054,989 A | 4/2000 | Robertson et al. |
| 6,201,554 B1 | 3/2001 | Lands |
| 6,380,953 B1 | 4/2002 | Mizuno |
| 6,674,450 B1 | 1/2004 | Toub et al. |
| 6,915,490 B1 | 7/2005 | Ewing |
| 7,050,056 B2 | 5/2006 | Meyringer |
| 7,168,045 B2 | 1/2007 | Fliess et al. |
| 7,340,484 B2 | 3/2008 | S et al. |
| 7,421,645 B2 | 9/2008 | Reynar |

(Continued)

FOREIGN PATENT DOCUMENTS

| | | |
|---|---|---|
| AU | 2011101579 A4 | 2/2012 |
| EP | 1696301 A1 | 8/2006 |

(Continued)

OTHER PUBLICATIONS

Arsanjani, Ali, "Rule Object 2001: A Pattern Language for Adaptive and Scalable Business Rule Construction", IBM National EAD Center of Competency [online], [retrieved on May 16, 2014], Retrieved from the Internet (URL: http://citeseerx.ist.psu.edu/viewdoc/download?doi=10.1.202.6970&rep=rep1&type=pdf), 2001.

(Continued)

*Primary Examiner* — David Zarka
*Assistant Examiner* — Khoa Vu
(74) *Attorney, Agent, or Firm* — Kenyon & Kenyon LLP

(57) ABSTRACT

Calendar application objects that do no not appear on the screen because of space constraints or other reasons may be associated with an edge of the time period displayed on the screen closest to a virtual location of each respective object in the calendar application. A user selectable indicator may then be displayed for one or more of the edges to indicate the presence of additional objects in the calendar application that are not currently displayed on the screen of the device, but would be displayed if the user were to scroll the displayed time period in the direction of the displayed time period edge associated with a respective indicator. The indicator may include additional data about the objects associated with the edge that do not appear within the time period shown on the screen.

20 Claims, 5 Drawing Sheets

(56) References Cited

U.S. PATENT DOCUMENTS

| | | | |
|---|---|---|---|
| 7,546,577 B2 | 6/2009 | Do et al. | |
| 7,603,381 B2 | 10/2009 | Burke et al. | |
| 7,739,695 B2 | 6/2010 | Wood et al. | |
| 7,908,584 B2 | 3/2011 | Singh et al. | |
| 8,024,666 B2 | 9/2011 | Thompson | |
| 8,191,003 B2 | 5/2012 | Brown et al. | |
| 8,214,748 B2 | 7/2012 | Srikanth et al. | |
| 8,402,480 B2 | 3/2013 | Rohwer | |
| 8,788,303 B1 | 7/2014 | Krone et al. | |
| 8,812,546 B1 | 8/2014 | Cornali | |
| 2002/0091586 A1 | 7/2002 | Wakai et al. | |
| 2002/0130899 A1 | 9/2002 | Ryan et al. | |
| 2003/0066032 A1 | 4/2003 | Ramachandran et al. | |
| 2003/0120621 A1 | 6/2003 | McDaniel et al. | |
| 2003/0160815 A1 | 8/2003 | Muschetto | |
| 2003/0182210 A1 | 9/2003 | Weitzman et al. | |
| 2003/0229848 A1 | 12/2003 | Arend et al. | |
| 2004/0252134 A1 | 12/2004 | Bhatt et al. | |
| 2005/0144038 A1* | 6/2005 | Tamblyn et al. | 705/2 |
| 2005/0171410 A1 | 8/2005 | Hjelt et al. | |
| 2005/0197998 A1 | 9/2005 | Asbury | |
| 2005/0278217 A1 | 12/2005 | Adams et al. | |
| 2005/0278372 A1 | 12/2005 | Shaburov et al. | |
| 2005/0289202 A1 | 12/2005 | S et al. | |
| 2006/0069666 A1 | 3/2006 | Burke et al. | |
| 2006/0089877 A1 | 4/2006 | Graziano et al. | |
| 2006/0206522 A1 | 9/2006 | Austin et al. | |
| 2006/0238538 A1 | 10/2006 | Kapler et al. | |
| 2007/0064022 A1 | 3/2007 | Silverbrook et al. | |
| 2007/0156430 A1 | 7/2007 | Kaetker et al. | |
| 2007/0180377 A1 | 8/2007 | Gittelman et al. | |
| 2007/0199006 A1 | 8/2007 | Mukundan et al. | |
| 2007/0211056 A1 | 9/2007 | Chakraborty et al. | |
| 2007/0219842 A1 | 9/2007 | Bansal et al. | |
| 2007/0233539 A1 | 10/2007 | Suenderhauf et al. | |
| 2007/0244875 A1 | 10/2007 | Bodin et al. | |
| 2007/0268246 A1 | 11/2007 | Hyatt | |
| 2007/0288283 A1 | 12/2007 | Fitzpatrick | |
| 2008/0040684 A1 | 2/2008 | Crump | |
| 2008/0114625 A1 | 5/2008 | Kline et al. | |
| 2008/0120129 A1 | 5/2008 | Seubert et al. | |
| 2008/0141142 A1 | 6/2008 | Lyle et al. | |
| 2008/0163125 A1 | 7/2008 | Gu et al. | |
| 2008/0178101 A1 | 7/2008 | Rode et al. | |
| 2008/0178500 A1 | 7/2008 | Teuteberg | |
| 2008/0195969 A1 | 8/2008 | Brown et al. | |
| 2008/0221946 A1 | 9/2008 | Balon | |
| 2008/0294994 A1 | 11/2008 | Kruger et al. | |
| 2008/0307323 A1* | 12/2008 | Coffman et al. | 715/753 |
| 2008/0313005 A1 | 12/2008 | Nessland et al. | |
| 2008/0319818 A1 | 12/2008 | Gurdin et al. | |
| 2008/0320558 A1 | 12/2008 | Imanishi et al. | |
| 2009/0076878 A1 | 3/2009 | Woerner et al. | |
| 2009/0158173 A1 | 6/2009 | Palahnuk et al. | |
| 2009/0174680 A1 | 7/2009 | Anzures et al. | |
| 2009/0254370 A1 | 10/2009 | Kondo et al. | |
| 2009/0254597 A1 | 10/2009 | Karoji | |
| 2009/0293074 A1 | 11/2009 | Rohwer | |
| 2010/0030783 A1 | 2/2010 | Ho et al. | |
| 2010/0099462 A1* | 4/2010 | Baek et al. | 455/566 |
| 2010/0131889 A1 | 5/2010 | Helmolt et al. | |
| 2010/0138334 A1 | 6/2010 | Warsaw et al. | |
| 2010/0145936 A1 | 6/2010 | Grinstein et al. | |
| 2010/0251954 A1 | 10/2010 | Yamada | |
| 2010/0318640 A1 | 12/2010 | Mehta et al. | |
| 2010/0325582 A1 | 12/2010 | Bansal et al. | |
| 2010/0333014 A1 | 12/2010 | Fritzley et al. | |
| 2011/0072394 A1 | 3/2011 | Victor | |
| 2011/0078016 A1 | 3/2011 | Wagenblatt et al. | |
| 2011/0078058 A1* | 3/2011 | Wagenblatt et al. | 705/30 |
| 2011/0078171 A1 | 3/2011 | Wagenblatt et al. | |
| 2011/0087708 A1 | 4/2011 | Teichmann et al. | |
| 2011/0099500 A1 | 4/2011 | Smith et al. | |
| 2011/0153629 A1 | 6/2011 | Lehmann et al. | |
| 2011/0157005 A1 | 6/2011 | Inoue | |
| 2011/0167369 A1* | 7/2011 | van Os | 715/769 |
| 2011/0167382 A1 | 7/2011 | van Os | |
| 2011/0179368 A1 | 7/2011 | King et al. | |
| 2011/0269435 A1 | 11/2011 | Dieckman | |
| 2011/0276351 A1 | 11/2011 | Kondo et al. | |
| 2011/0283242 A1 | 11/2011 | Chew et al. | |
| 2011/0289422 A1 | 11/2011 | Spivack et al. | |
| 2011/0298830 A1 | 12/2011 | Lam | |
| 2012/0011426 A1 | 1/2012 | Yach | |
| 2012/0032877 A1 | 2/2012 | Watkins, Jr. et al. | |
| 2012/0036485 A1 | 2/2012 | Watkins, Jr. et al. | |
| 2012/0079408 A1 | 3/2012 | Rohwer | |
| 2012/0105484 A1 | 5/2012 | Cui | |
| 2012/0117493 A1 | 5/2012 | Gu et al. | |
| 2012/0131496 A1 | 5/2012 | Goossens et al. | |
| 2012/0174013 A1 | 7/2012 | Kraus et al. | |
| 2012/0198369 A1 | 8/2012 | Sorin et al. | |
| 2012/0253869 A1 | 10/2012 | Ansley | |
| 2012/0284637 A1 | 11/2012 | Boyer et al. | |
| 2012/0304121 A1 | 11/2012 | Cahill et al. | |
| 2013/0038625 A1 | 2/2013 | Nakajima | |
| 2013/0074003 A1 | 3/2013 | Dolenc | |
| 2013/0085961 A1 | 4/2013 | Naghshin et al. | |
| 2013/0144880 A1 | 6/2013 | Kemmer et al. | |
| 2013/0290340 A1 | 10/2013 | Suermondt et al. | |
| 2013/0321340 A1 | 12/2013 | Seo et al. | |
| 2014/0036639 A1 | 2/2014 | Boni et al. | |
| 2014/0225897 A1 | 8/2014 | Sarrazin et al. | |

FOREIGN PATENT DOCUMENTS

| | | |
|---|---|---|
| EP | 1837736 A2 | 9/2007 |
| EP | 2330470 A1 | 6/2011 |
| JP | 2009050937 A | 3/2009 |

OTHER PUBLICATIONS

Anonymous: "Google Calender—Revision as of 16:55, Aprl. 17, 2012," pp. 1-7, Gustavus Adolphus College, retrieved from the Internet: URL:https://gustavus.edu/gts/w/index.php?title=Google_Calendar&oldid=24920 [retrieved on Jan. 10, 2014].

Seavus ProjectViewer 4.1, User Manual, 2009—Section 3.7 (groups) 3.6 (filters).

"Active Knowledge Modeling—Architect Your Business—12 Different Ways to Model Business Processes," http://activeknowledgemodeling.com/2009/03/31/12-different-ways-to-model-business-processes/, Mar. 31, 2009, 8 pages.

"Layer Container," http://homepage.mac.com/dlemmermann/DLSC/manual/components/layercontainer/layercontainer.html, 2007, 2 pages.

IBM TDB and Torres, R.J. "Zooming on Visual Calendar Data," IPCOM Prior Art Database, http://ip.com/IPCOM/000121803, Sep. 1, 1991, 2 pages.

Burigat et al., "Visualizing references to off-screen content on mobile devices: A comparison of Arrows, Wedge, and Overview + Detail," Interacting With Computers, 2011 Elsevier B.V., pp. 156-166.

Google: "Android 2.3.4 User's Guide," googleusercontent.com, May 20, 2011, Retrieved on Oct. 10, 2013 from the Internet: URL:http://static.googleusercontent.com/external_content/untrusted_dlcp/www.google.com/en/help/hc/pdfs/mobile/AndroidUsersGuide-2.3.4.pdf.

Office Action, dated Feb. 4, 2015, from EP Application No. 13178606.3 filed Jul. 30, 2013.

* cited by examiner

INDICATION OF OFF-SCREEN CALENDAR OBJECTS

BACKGROUND

Advances in computing technologies have enabled smaller devices, such as phones and tablets with touch screen interfaces, to execute more sophisticated applications. As a result, users are able to perform many of the functions on their phones and tablets that they previously performed on their computers and laptops. For example, users are able to view web pages, email, and calendar information on their phones as well as on their computers and laptops.

However, some calendar applications, such as Gantt charts, may include dense amounts of calendar entries and information. Such information is easier to view and comprehend when viewed on the larger screen sizes that are typically found on desktop monitors and laptops. The much smaller screens on phones and tablets make it difficult for a user to quickly find, navigate, and comprehend the dense information that may be included in some calendar applications on these smaller screens.

There is thus a need for more efficient techniques that enable users to quickly find, navigate, and comprehend information displayed in calendar applications on these smaller devices.

DETAILED DESCRIPTION

Objects included in a calendar application, including, but not limited to, projects, tasks, meeting requests, activities, campaigns, trade promotions, calendar entries, and deadlines, may be associated with different time periods. Some of these objects associated with times outside a time range displayed on the screen of a device may not be shown on the screen of the device. Objects that are associated with times outside a time period displayed on the screen may also be associated with an edge of the time period displayed on the device. A user selectable indicator may then be displayed for each of the edges of the displayed time period having at least one object associated with the edge. The indicator may be displayed to indicate the presence of additional objects in the calendar application that are not currently displayed on the screen of the device, but would be displayed if the user were to scroll the displayed time period in the direction of the displayed time period edge associated with a respective indicator.

The indicator may include additional data about the objects associated with the edge that do not appear within the time period displayed on the device. This additional data may include, but is not limited to, a count of the number of objects associated with each edge or a sum of fields or terms, such as financial terms, of objects associated with each edge. Once the user selects one of the indicators, the time period displayed on the screen of the device may be changed to show at least one off screen object associated with the indicator on the screen of the device.

Figure 1:
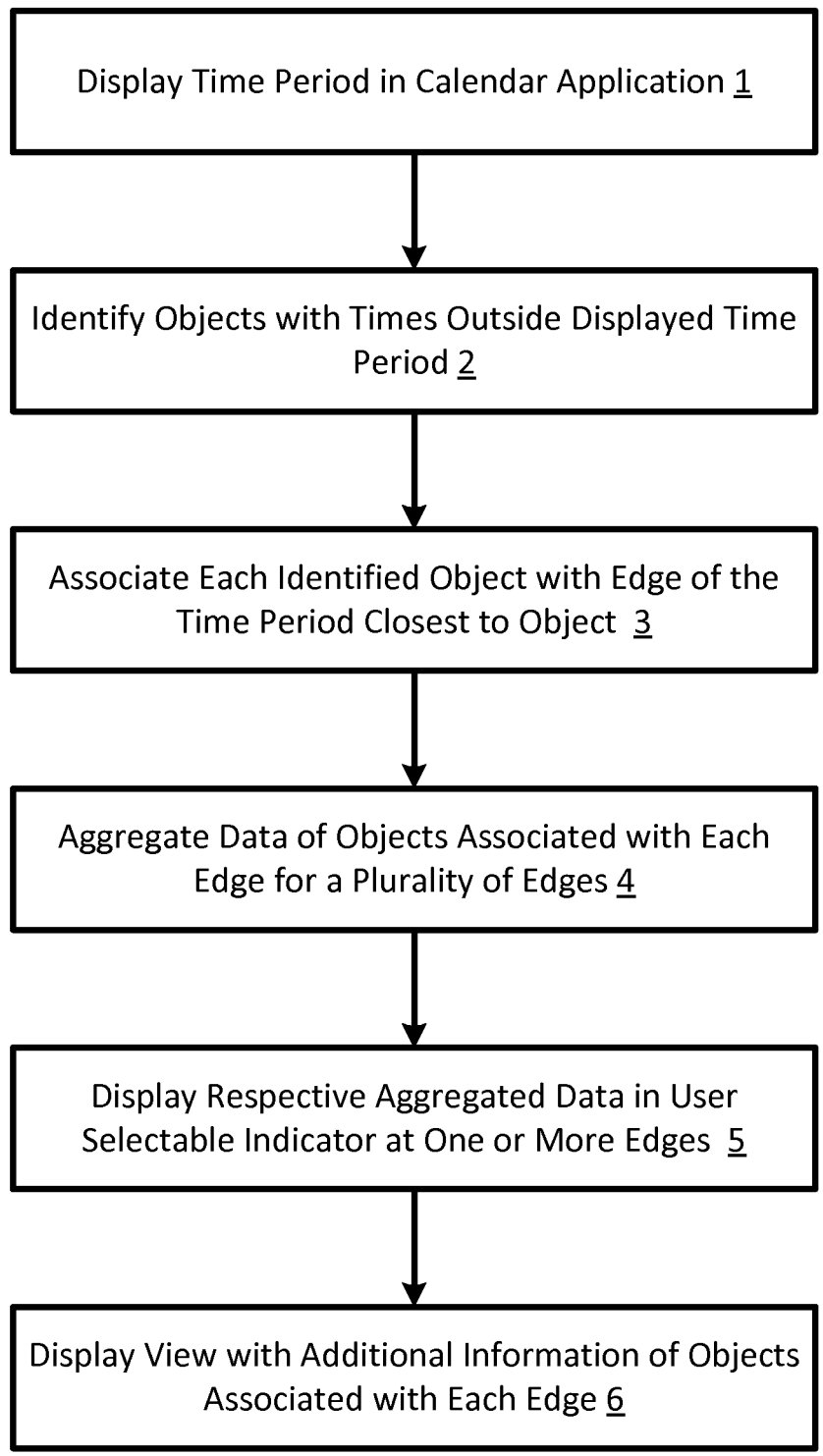
FIG. 1 shows an exemplary process.

FIG. 1 shows an exemplary process. The processes referred to herein may be performed by a processing device. In some instances, the process may be stored in instructions encoded in a non-transitory computer readable medium, that when executed by the processing device, cause the processing device to perform the process. The process may also be part of a calendar application executed at a computing device having a touch screen.

In box 1, a time period in a calendar application may be displayed on a screen. The time period displayed on the screen may be a subset of a larger time span covered by the calendar application. For example, the calendar application may contain various objects, such as calendar entries, for different times over a period of several years. However, only a few days, weeks, or months may be viewable at any one time on the screen.

In box 2, one or more objects in the calendar application that are associated with times outside the time period displayed on the screen may be identified.

In box 3, each of the identified objects may be associated with an edge of the displayed time period closest to a virtual location of each object in the calendar application. For example, if a calendar application shows a linear timeline on a screen starting with Nov. 1, 2012 on a left edge of the timeline and ending with Nov. 30, 2012 on a right edge of the timeline then each of the identified objects associated with a time prior to Nov. 1, 2012 may be associated with left edge of the timeline, while each of the identified objects associated with a time after Nov. 30, 2012 may be associated with right edge of the timeline. Other time, timeline, and/or calendaring formats may be used in different embodiments. In one non-limiting example, months may be displayed in a monthly calendar format instead of a linear timeline format.

In box 4, once each of the identified objects has been associated with an edge of the displayed time period, data of the identified objects associated with each edge of the displayed time period may be aggregated. The data may be aggregated in one instance by counting a quantity of the identified objects associated with each edge. For example, if there are three objects calendared for times preceding an earliest time associated with one edge of a displayed time period in the calendar application, then the aggregated data for that edge may be the count of the three preceding objects.

Other functions, such as logical, mathematical, or statistical functions may be used in other instances to aggregate object data. For example, in some instances the aggregated data may include a sum of amounts, including, but not limited to revenues, costs, or financial terms of the objects associated with each edge.

In box 5, the respective aggregated data at each edge may be displayed in a user selectable indicator associated with the edge for each of those edges of the displayed time period having at least one identified object associated with them.

In box 6, in response to a user selection of the indicator, a view may provide additional information of the objects outside the time period that is displayed in the calendar application so that the user does not have to manually scroll through different time periods to find the objects. In some instances, the displayed time period may be changed in response to a user selection of an object and/or the indicator so that the user can quickly "jump" to view one or more of the objects that are outside the time period without having to manually scroll through different time periods to find the object.

As part of this jumping process, the displayed time period may be changed so that each of the selected objects that were previously outside the displayed time period, now appear within the changed time period. The start time and/or the end time of the time period displayed on the screen may be scaled to display these objects that were previously outside the displayed time period and therefore not visible to the user on the screen.

Figure 2:
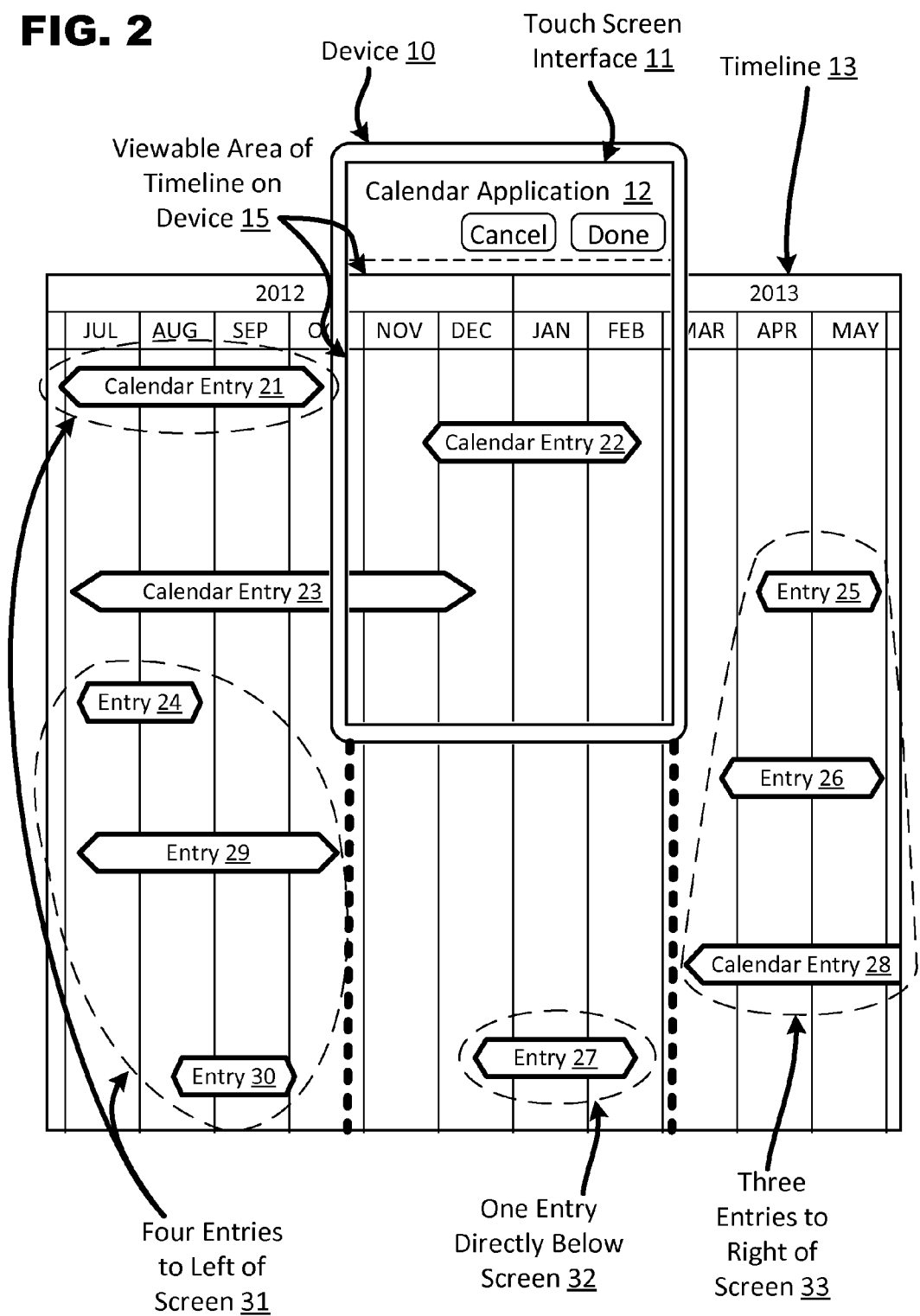
FIG. 2 shows an exemplary timeline, a portion of which is also shown as being displayed on a device.

FIG. 2 shows an exemplary timeline 11 including several calendar entry objects 21 to 30. The timeline 11 in FIG. 2 shows the time period from late June 2012 to early June 2013. However, only a subset of that time period between late October 2012 to early March 2013 is shown within the viewable area 15 of the device 10 executing the calendar application 12. The device 10 may include a touch screen interface 11 with a touch sensitive screen for a user to select one or more objects on the screen 11 of the device 10.

In the example shown in FIG. 2, only two of the calendar objects 22 and 23 are currently viewable by the user on the screen 11 of the device 10. Calendar objects 21, 24, 29 and 30 are all associated with times occurring before the earliest time displayed on the screen 11. These four calendar entries 21, 24, 29, and 30 that do not appear on the screen 11 because they occur before the time period shown, may therefore be associated with a left edge 31 of the screen, which may be representative of the direction a user would move the timeline to display these entries on the screen.

The three entry objects 25, 26, and 28 occurring after the last time displayed on the screen may be associated with the right edge 33 of the touch screen interface 11. This association may be used because a user would have to scroll the timeline to the right to be able to view the entries. Similarly, the object 27 that is associated with a time period that is within the time period displayed in the screen 11 but is not located with the viewable area 15 of the screen 11 may be associated with a bottom edge 32 of the screen 11, since this is a direction a user would ordinarily have to scroll to view the entry 27 in the viewable area 15 of the screen 11. In some instances, the edges of the displayed time period may include a top edge, a bottom edge, a right edge, and a left edge. Additional or fewer edges may be provided in different embodiments depending on the structure and/or shape associated with the displayed time period.

In the example shown in FIG. 2, each of the calendar objects associated with a time outside the time period displayed in the calendar application is selected and associated with at least one of the edges. In other instances, not all of these calendar objects need to be selected and associated with an edge.

In some instances, a criterion may be used to identify a subset of the objects associated with times outside the displayed time period in the calendar application that satisfy the criterion. The identified subset of objects may then be designated as the identified objects. In some instances, data of only the identified subset of objects associated with each edge may be aggregated.

Figure 3:
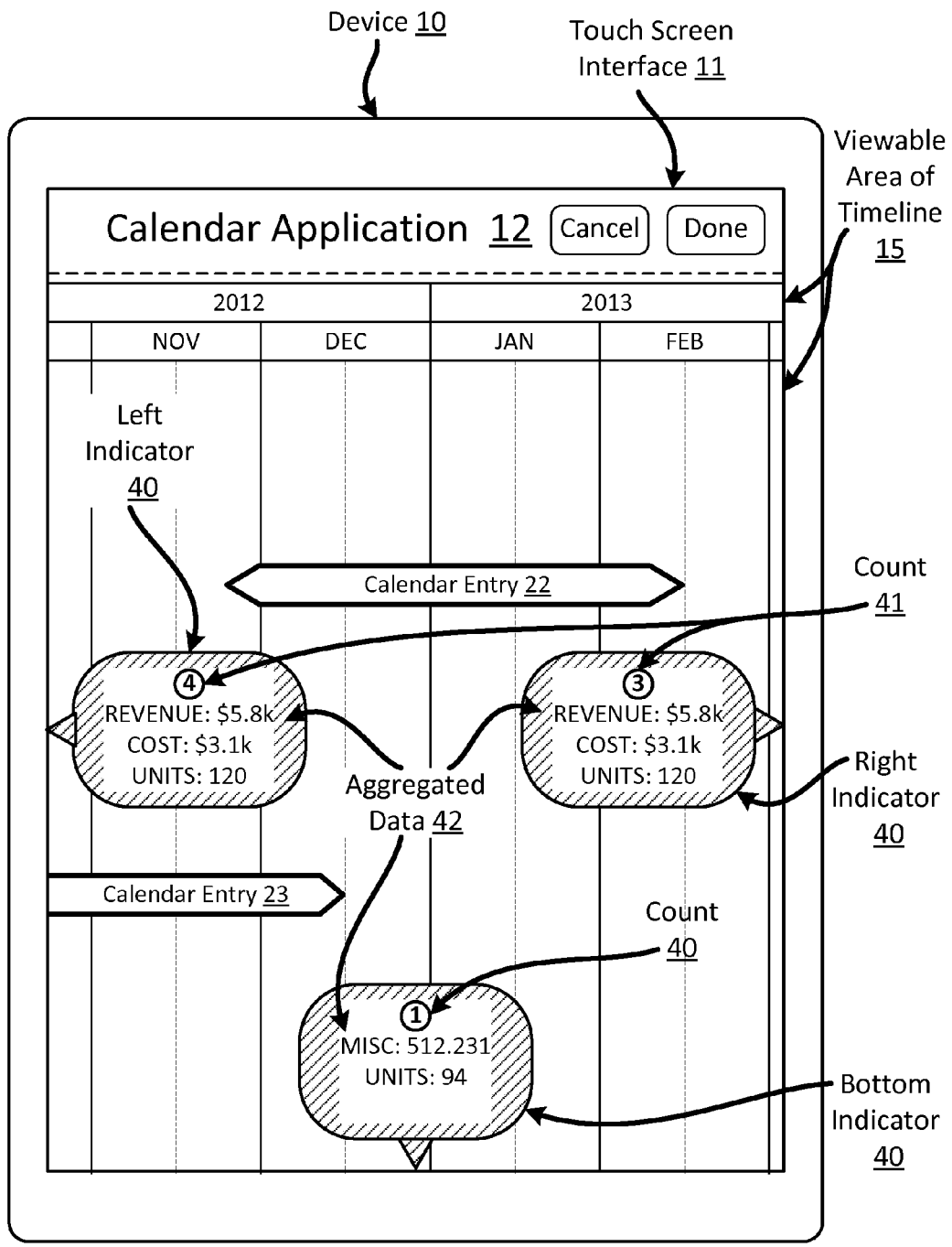
FIG. 3 shows an exemplary viewable area of a timeline as displayed on a device

FIG. 3 shows an exemplary viewable area of the timeline 15 as displayed on the device 10 with user selectable indicators 40. The three displayed user selectable indicators 40 may each correspond to respective edges of the time period displayed in the viewable area 15. The user selectable indicators 40 may include a count 41 of a quantity of identified objects associated with each respective edge of the displayed time period and/or aggregated data 42 from the identified objects associated with each respective edge of the displayed time period.

For example, the left indicator 40 associated with the left edge of the viewable area 15, may include a count of 4 objects (referring to objects 21, 24, 29, and 30 all of which are located to the left of the left edge of the viewable timeline area 15 as shown in FIG. 2). The bottom indicator 40 associated with the bottom edge of the viewable area 15 may include a count of 1 object (referring to object 27 located below the bottom edge of the viewable timeline area 15 as shown in FIG. 2). The right indicator 40 associated with the right edge of the viewable area 15, may include a count of 3 objects (referring to objects 25, 26, and 28 all of which are located to the right of the right edge of the viewable timeline area 15 as shown in FIG. 2).

Each of the indicators 40 may also display aggregated data 42 from the respective objects. For example, the left and right indicators 40 may show total revenues, total costs, and total units associated with each of the four objects to the left and the three objects to the right of the viewable area 15 of the timeline. The aggregated data 42 that is displayed in each of the indicators 40 may be manually or automatically selected.

Different automated processes may be used to automatically identify and aggregate data from multiple objects. For example, a numeric data field common to at least a majority of the identified objects associated with each respective edge may be identified. Once the numeric data field has been identified, numeric data in the common numeric data field of the identified objects associated with each respective edge may be aggregated. Thereafter, the respective aggregated numeric data may be displayed in the user selectable indicator at each respective edge.

In some instances, the identified numeric data field may, but need not be, common to each of the identified objects associated with each respective edge. In some instances, data may be aggregated from two or more numeric data fields. For example, a plurality of numeric data fields common to the identified objects associated with each respective edge may be identified. Numeric data in each of the identified numeric data fields in each of the identified objects associated with each respective edge may be aggregated. The respective aggregated numeric data for each identified numeric data field may be displayed in the user selectable indicator at each respective edge.

Figure 4:
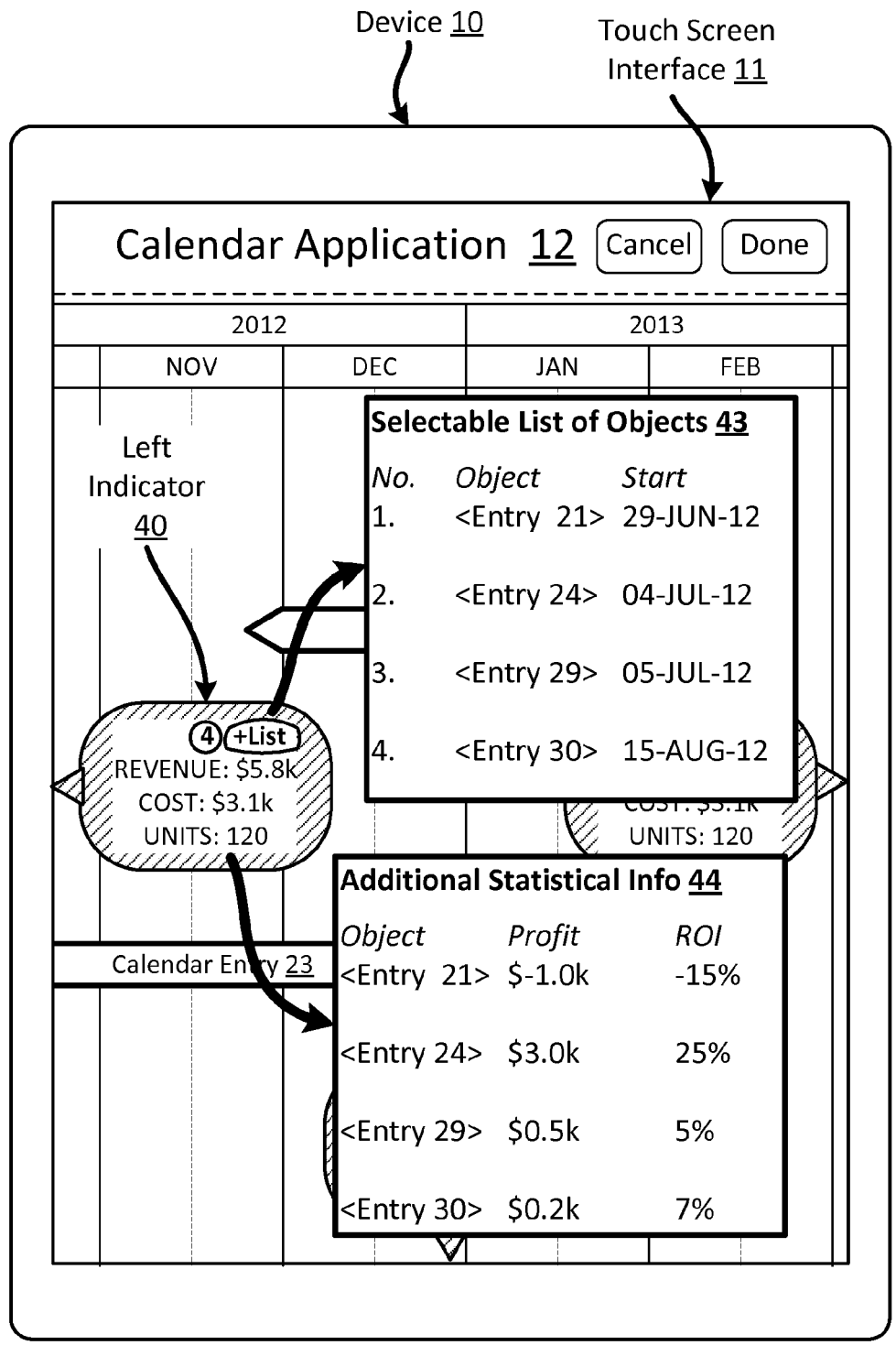
FIG. 4 shows exemplary additional information associated with an indicator that may be displayed.

FIG. 4 shows exemplary additional information associated with an indicator 40 that may be displayed on the screen 11 of the device 10. In some instances, additional information may be displayed in response to the user selecting or manipulating a particular area of the indicator 40. An indicator 40 may include one or more user selectable options that may perform different functions. For example, in some instances, at least two user selectable options may be provided as part of the user selectable indicator 40. A user may select one of the options by touching, for example, one area of the indicator 40, such as the +List button shown in FIG. 4, or another area, such as the area displaying the statistical information or the count of the number of objects.

In some situations, in response to a user selecting a first option in the user selectable indicator 40, a selectable list 43 of the identified objects associated with the respective edge may displayed. Once the selectable list 43 of the identified objects is displayed, a user may then select one or more of the objects in the list 43. In response to a user selection of an object in the displayed selectable list 43, the time period in the calendar application may be changed to display the selected object(s) from the displayed list 43 on the screen 11. In other situations, in response to a user selecting a second option, the displayed time period in the calendar application may be changed to display a different set of objects that appeared outside the originally displayed time period, such as only those that appeared before or after the displayed time period.

In some instances, in response to a user selecting a third option, additional statistical information 44 about the aggregated data associated with the respective edge may be displayed on the screen 11. This additional statistical information 44 may include additional information about the data associated with each of the objects of the respective indicator 40. For example, the additional information 44 may include additional aggregated data that was not displayed in the indicator, and/or the additional information 44 may include more detailed information about the aggregated data displayed in the indicator.

In some instances, one or more of the user selectable indicators may be resizable and may display more or less of the aggregated data depending on its size and/or any resizing of the indicator.

Figure 5:
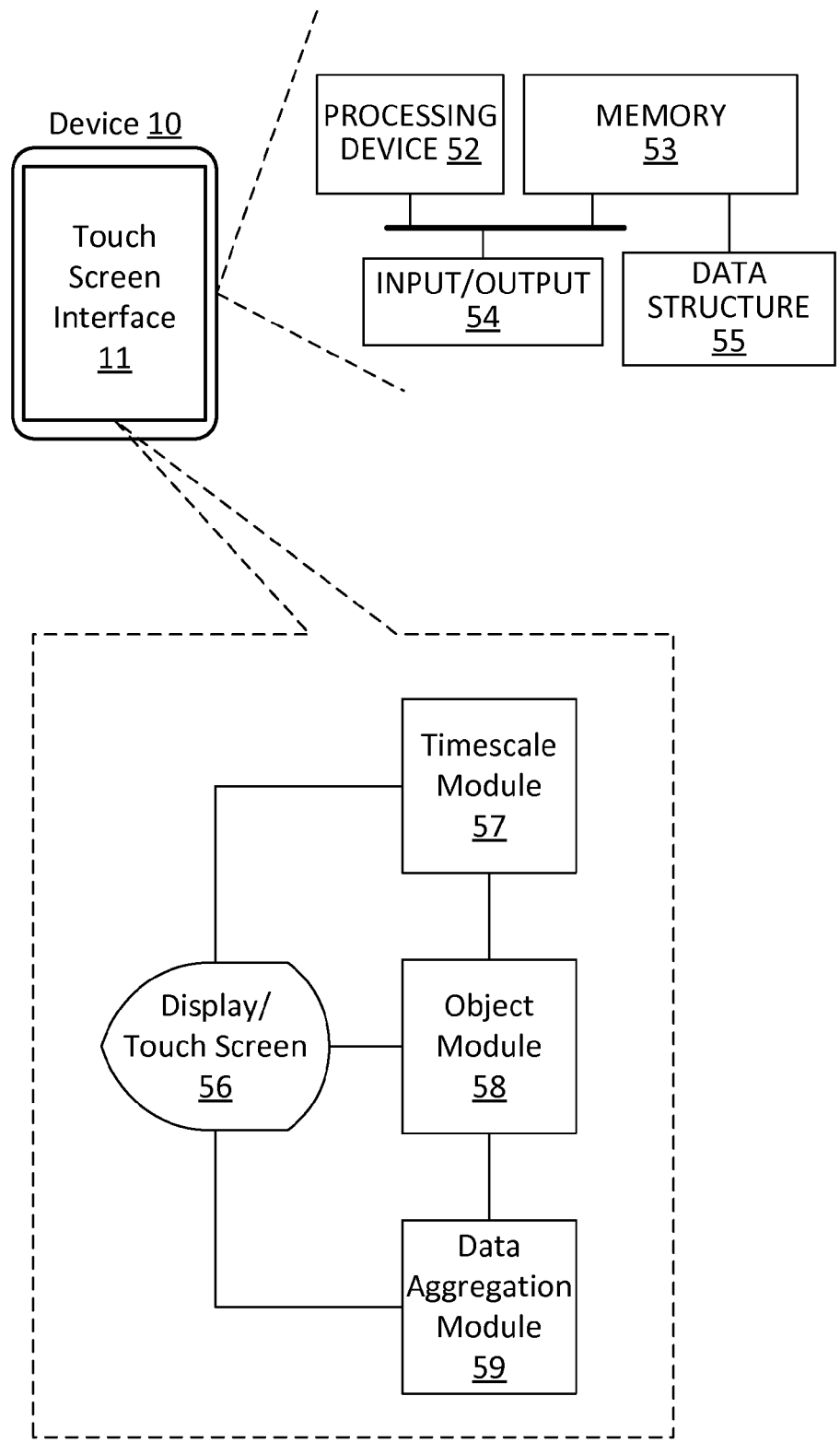
FIG. 5 shows an exemplary architecture.

FIG. 5 shows an exemplary architecture. A device 10 may include a touch screen interface 11, processing device 52, memory 53, and communications interface 54. The touch screen interface 11 may include a display, which may be a touch screen, capable of displaying data to a user of the device 10. The touch screen interface 11 may include a timescale module 57 coupled to an object module 58 and a data aggregation module 59, each of which may be coupled to the screen 56 or sensor of the touch sensitive screen 56. The sensor of the touch sensitive display screen 56 may be a capacitive or other type of touch detection sensor, configured to detect and track movement on the surface and/or in the vicinity of the display. The sensor may be coupled to a signal processing circuit that is configured to identify, locate, and/or track object movement based on the data obtained from sensor. The sensor may enable a user to touch an area of the touch screen displaying the user selectable indicator in order for the user to select the user selectable indicator.

Memory 53 may include a computer readable medium storing application modules, which may include instructions associated with the modules 57 to 59.

The timescale module 57 may include functionality for displaying a time period in a calendar application on the touch sensitive screen.

The object module 58 may include functionality for identifying a plurality of objects associated with times outside the displayed time period in the calendar application and associating each of the identified objects with an edge of the displayed time period closest to a virtual location of each object in the calendar application.

The data aggregation module 59 may include functionality for aggregating data of the identified objects associated with each edge of the displayed time period and displaying the respective aggregated data in a user selectable indicator for each of those edges of the displayed time period having at least one identified object associated with them.

The timescale module 57 may also include functionality for changing the time period in the calendar application to display at least one of the identified objects associated with the respective edge. The timescale module 57 may change the time period in response to a user selection of the indicator for one of the edges. In some instances where a user is able to select one or more specific objects associated with the user selected indicator, the timescale module 57 may change the time period in the calendar application to display all of the user selected objects associated with the user selected indicator on the touch sensitive screen 56.

The device 10 may contain a processing device 52, memory 53 storing loaded data or a loaded data structure 55, and a communications device 54, all of which may be interconnected via a system bus. In various embodiments, the device 10 may have an architecture with modular hardware and/or software systems that include additional and/or different systems communicating through one or more networks via communications device 54.

Communications device 54 may enable connectivity between the processing devices 52 in the device 10 and other systems by encoding data to be sent from the processing device 52 to another system over a network and decoding data received from another system over the network for the processing device 52.

In an embodiment, memory 53 may contain different components for retrieving, presenting, changing, and saving data and may include computer readable media. Memory 53 may include a variety of memory devices, for example, Dynamic Random Access Memory (DRAM), Static RAM (SRAM), flash memory, cache memory, and other memory devices. Additionally, for example, memory 53 and processing device(s) 52 may be distributed across several different computers that collectively comprise a system. Memory 53 may be capable of storing each user selected value from the displayed second list each time the second list is displayed.

Processing device 52 may perform computation and control functions of a system and comprises a suitable central processing unit (CPU). Processing device 52 may include a single integrated circuit, such as a microprocessing device, or may include any suitable number of integrated circuit devices and/or circuit boards working in cooperation to accomplish the functions of a processing device. Processing device 52 may execute computer programs, such as object-oriented computer programs, within memory 53. Processing device 52 may be capable of filtering data according to each stored user selected value associated with each respective selected first list characteristic.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the processing device 52 is shown as separate from the modules 57 to 59 and the touch screen interface 11, in some instances the processing device 52 and the touch screen interface 11 and/or one or more of the modules 57 to 59 may be functionally integrated to perform their respective functions.

We claim:

1. A computer-implemented method, comprising:
    displaying a time period of a calendar application in a viewable area of a display device, wherein the time period corresponds to the viewable area, the time period being defined by at least one of a left edge and a right edge, beyond which elements are not visible;
    identifying a plurality of objects associated with times outside the displayed time period in the calendar application;
    associating, using a processing device, each of the identified objects with a respective edge of the displayed time period closest to a virtual location of the respective identified object in the calendar application;
    aggregating data of the identified objects associated with each edge of the displayed time period;
    displaying the respective aggregated data in a user selectable indicator for each of those edges of the displayed time period having at least one identified object associated with them;
    providing at least two selectable options as part of the user selectable indicator;
    responsive to a user selection of a first of the options, changing the time period in the calendar application to display the at least one of the identified objects associated with the respective edge;

responsive to a user selection of a second of the options, displaying a selectable list of the identified objects associated with the respective edge; and responsive to a user selection of an object in the displayed selectable list, changing the time period in the calendar application to display the selected object in the displayed list.

2. The computer-implemented method of claim 1, wherein the aggregated data includes a count of a quantity of the identified objects associated with each edge.

3. The computer-implemented method of claim 1, wherein the aggregated data includes a sum of financial terms of the identified objects associated with each edge.

4. The computer-implemented method of claim 1, further comprising:

identifying a subset of the objects associated with times outside the displayed time period in the calendar application satisfying an object criterion; and designating the identified subset of objects as the identified objects.

5. The computer-implemented method of claim 1, further comprising:

identifying a subset of the objects associated with times outside the displayed time period in the calendar application satisfying an object criterion; and aggregating data of only the identified subset of objects associated with each edge.

6. The computer-implemented method of claim 1, wherein the time period is further defined by at least one of a top edge and a bottom edge.

7. The computer-implemented method of claim 1, further comprising, for those edges of the displayed time period having at least one identified object associated with them:

identifying a numeric data field common to at least a majority of the identified objects associated with each respective edge;

aggregating numeric data in the common numeric data field of the identified objects associated with each respective edge; and displaying the respective aggregated numeric data in the user selectable indicator at each respective edge.

8. The computer-implemented method of claim 7, wherein the identified numeric data field is common to each of the identified objects associated with each respective edge.

9. The computer-implemented method of claim 7, further comprising:

identifying a plurality of numeric data fields common to the identified objects associated with each respective edge;

aggregating numeric data in each of the identified numeric data fields in each of the identified objects associated with each respective edge; and displaying the respective aggregated numeric data for each identified numeric data field in the user selectable indicator at each respective edge.

10. The computer-implemented method of claim 1, wherein, responsive to the user selection of the indicator, the time period in the calendar application is changed to display each of the identified objects associated with the respective edge.

11. The computer-implemented method of claim 1, wherein, responsive to the user selection of the indicator, the time period in the calendar application is changed to display an identified object associated with the respective edge and a nearest time to the time period.

12. The computer-implemented method of claim 11, further comprising scaling at least one of a start time and an end time of the time period in the calendar application to display the identified object associated with the respective edge and the nearest time to the time period.

13. The computer-implemented method of claim 1, further comprising:

provide a third user selectable option as part of the user selectable indicator; and responsive to a user selection of the third option, displaying additional statistical information about the aggregated data associated with the respective edge.

14. The computer-implemented method of claim 1, further comprising:

executing the calendar application at a computing device having a touch screen;

displaying the time period on the touch screen;

displaying the user selectable indicator and the respective aggregated data on the touch screen at each respective edge of the displayed time screen; wherein a user touches an area of the touch screen displaying the user selectable indicator to select the user selectable indicator.

15. The computer-implemented method of claim 1, wherein the user selectable indicator at each edge is resizable and displays more or less of the aggregated data depending on its size.

16. A non-transitory computer readable medium comprising stored instructions that, when executed by a processing device, cause the processing device to:

display a time period of a calendar application in a viewable area of a display device, wherein the time period corresponds to the viewable area, the time period being defined by at least one of a left edge and a right edge, beyond which elements are not visible;

identify a plurality of objects associated with times outside the displayed time period in the calendar application;

associate, using a processing device, each of the identified objects with a respective edge of the displayed time period closest to a virtual location of the respective identified object in the calendar application;

aggregate data of the identified objects associated with each edge of the displayed time period;

display the respective aggregated data in a user selectable indicator for each of those edges of the displayed time period having at least one identified object associated with them;

provide at least two selectable options as part of the user selectable indicator;

responsive to a user selection of a first of the options, change the time period in the calendar application to display the at least one of the identified objects associated with the respective edge;

responsive to a user selection of a second of the options, display a selectable list of the identified objects associated with the respective edge; and responsive to a user selection of an object in the displayed selectable list, change the time period in the calendar application to display the selected object in the displayed list.

17. The computer readable medium of claim 16, wherein the aggregated data includes a count of a quantity of the identified objects associated with each edge and a sum of financial terms of the identified objects associated with each edge.

18. A system comprising:
a touch sensitive screen;
a processing device including:
  a timescale module for displaying a time period in a calendar application on the touch sensitive screen, the time period corresponding to a viewable area of the touch sensitive screen, the time period being defined by at least one of a left edge and a right edge, beyond which elements are not visible;
  an object module for identifying a plurality of objects associated with times outside the displayed time period in the calendar application and associating each of the identified objects with a respective edge of the displayed time period closest to a virtual location of the respective identified object in the calendar application; and
  a data aggregation module for:
    aggregating data of the identified objects associated with each edge of the displayed time period;
    displaying the respective aggregated data in a user selectable indicator for each of those edges of the displayed time period having at least one identified object associated with them;
    providing at least two selectable options as part of the user selectable indicator;
    responsive to a user selection of a first of the options, changing the time period in the calendar application to display the at least one of the identified objects associated with the respective edge;
    responsive to a user selection of a second of the options, displaying a selectable list of the identified objects associated with the respective edge; and
    responsive to a user selection of an object in the displayed selectable list, changing the time period in the calendar application to display the selected object in the displayed list.

19. The system of claim 18, wherein responsive to a user selection of a plurality of objects associated with the user selected indicator, the timescale module changes the time period in the calendar application to display all of the user selected objects associated with the user selected indicator on the touch sensitive screen.

20. A computer-implemented method, comprising:
  displaying a time period in a calendar application;
  identifying a plurality of objects associated with times outside the displayed time period in the calendar application;
  associating, using a processing device, each of the identified objects with an edge of the displayed time period closest to a virtual location of each object in the calendar application;
  identifying a numeric data field common to at least a majority of the identified objects associated with the edge;
  aggregating numeric data in the common numeric data field of the identified objects associated with the edge;
  displaying the respective aggregated numeric data in a user selectable indicator associated with the edge;
  providing at least two user selectable options as part of the user selectable indicator;
  responsive to a user selection of a first of the options, scaling at least one of a start time and an end time of the time period in the calendar application to display the identified objects;
  responsive to a user selection of a second of the options, displaying a selectable list of the identified objects associated with the respective edge; and
  responsive to a user selection of an object in the displayed selectable list, changing the time period in the calendar application to display the selected object.

* * * * *